US008259156B2

(12) United States Patent
Read

(10) Patent No.: US 8,259,156 B2
(45) Date of Patent: Sep. 4, 2012

(54) VIDEOCONFERENCE ARRANGEMENT

(75) Inventor: Christopher Jensen Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 924 days.

(21) Appl. No.: 12/342,270

(22) Filed: Dec. 23, 2008

(65) Prior Publication Data

US 2010/0157015 A1    Jun. 24, 2010

(51) Int. Cl.
*H04N 7/14* (2006.01)
(52) U.S. Cl. ............... 348/14.08; 348/14.12; 348/14.01; 397/428
(58) Field of Classification Search .... 348/14.01–14.16; 396/428, 439, 49, 379; 709/204–205; 370/260, 370/503, 229
See application file for complete search history.

(56) References Cited

U.S. PATENT DOCUMENTS

| 6,121,998 | A | 9/2000 | Voois et al. |
| 7,428,000 | B2 | 9/2008 | Cutler et al. |
| 2004/0003045 | A1* | 1/2004 | Tucker et al. ................. 709/205 |
| 2005/0073575 | A1* | 4/2005 | Thacher et al. ............ 348/14.13 |
| 2006/0176832 | A1* | 8/2006 | Miceli ............................ 370/260 |
| 2006/0239443 | A1 | 10/2006 | Oxford et al. |
| 2007/0013768 | A1* | 1/2007 | Hwang ........................ 348/14.01 |
| 2008/0143819 | A1 | 6/2008 | Rodman et al. |

FOREIGN PATENT DOCUMENTS

JP        2008288962 A    * 11/2008

OTHER PUBLICATIONS

"Video Conferencing Systems, Multipoint Conferencing and Gateways, Video Cameras and Accessories, Audio Conferencing Phones;" AVTelco Electronics, date unknown.
"OEM-ready System for Consumer Video Conferencing Applications," Streaming Networks, date unknown.
"Overview of the H.264/AVC Video Coding Standard," Thomas Wiegand, Gary J. Sullivan, Gisle Bjontegaard and Ajay Luthra, IEEE Transactions on Circuits and Systems for Video Technology, vol. 13, No. 7, Jul. 2003.

* cited by examiner

*Primary Examiner* — Melur Ramakrishnaiah
(74) *Attorney, Agent, or Firm* — Miller Patent Services; Jerry A. Miller

(57) ABSTRACT

A television and camcorder combination include an acoustic echo canceller and a videoconference protocol stack in order to provide videoconferencing capabilities using only a television in combination with an attached camcorder. This abstract is not to be considered limiting, since other embodiments may deviate from the features described in this abstract.

9 Claims, 2 Drawing Sheets

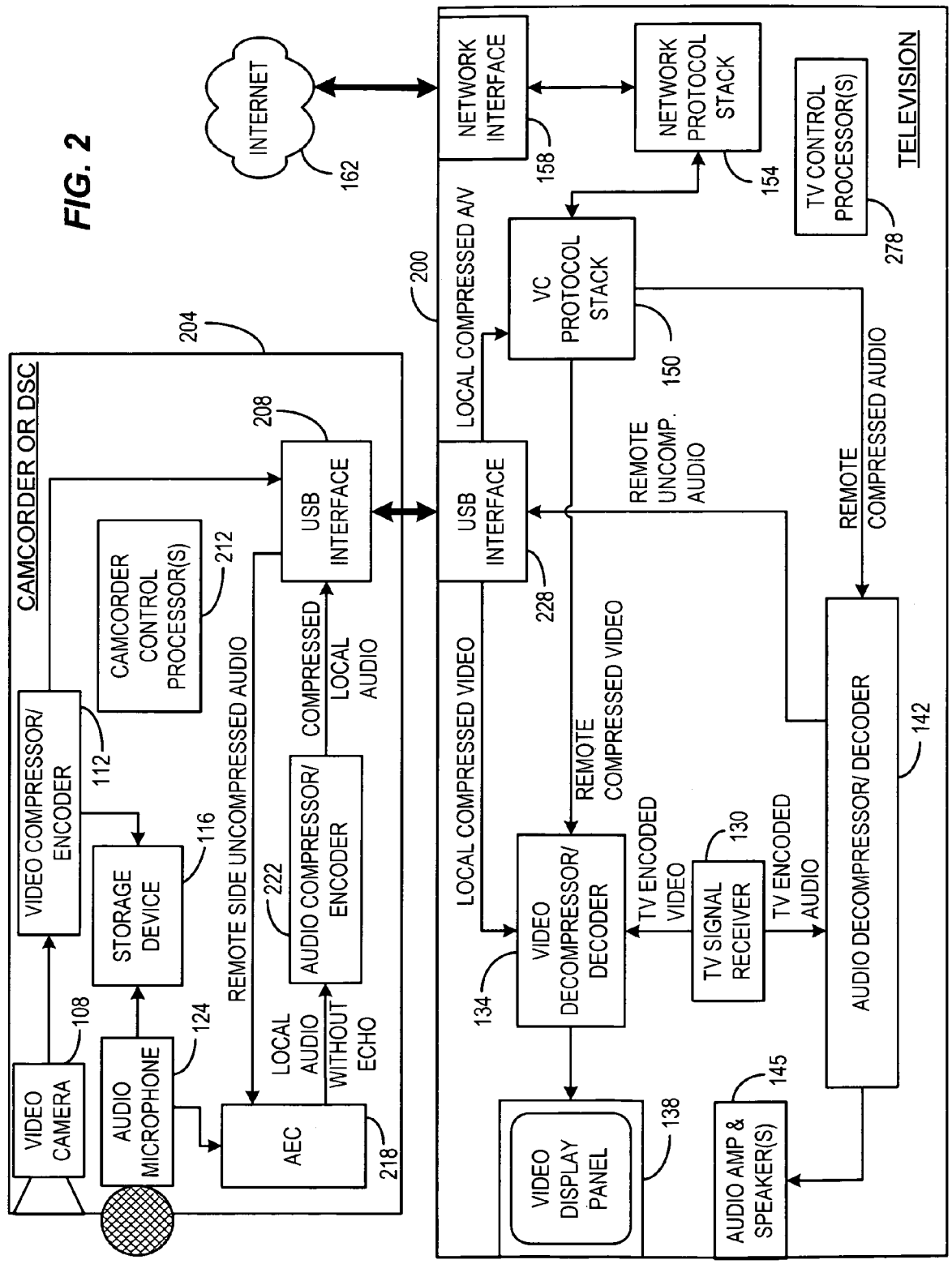

VIDEOCONFERENCE ARRANGEMENT

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

In order to carry out a videoconference, most commonly one utilizes dedicated videoconferencing hardware that is designed to provide imaging of the users at each end of a telephone or data line connection and to provide a display for viewing the other party or parties to the videoconference. More recently, computers have been adapted with cameras and specialized software in order to bring videoconferencing to the computer user's desk. Videoconferencing has been a desired capability and a viable business for decades. The primary problems have been cost and reliable high-bit-rate communications bandwidth. With broadband Internet connections to homes and businesses becoming standard infrastructure, sufficient communications bandwidth is becoming almost free. The cost of equipment then becomes the primary concern.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 2 is a block diagram of a second example implementation of a videoconferencing arrangement consistent with certain embodiments of the present invention.

DETAILED DESCRIPTION

Figure 1:
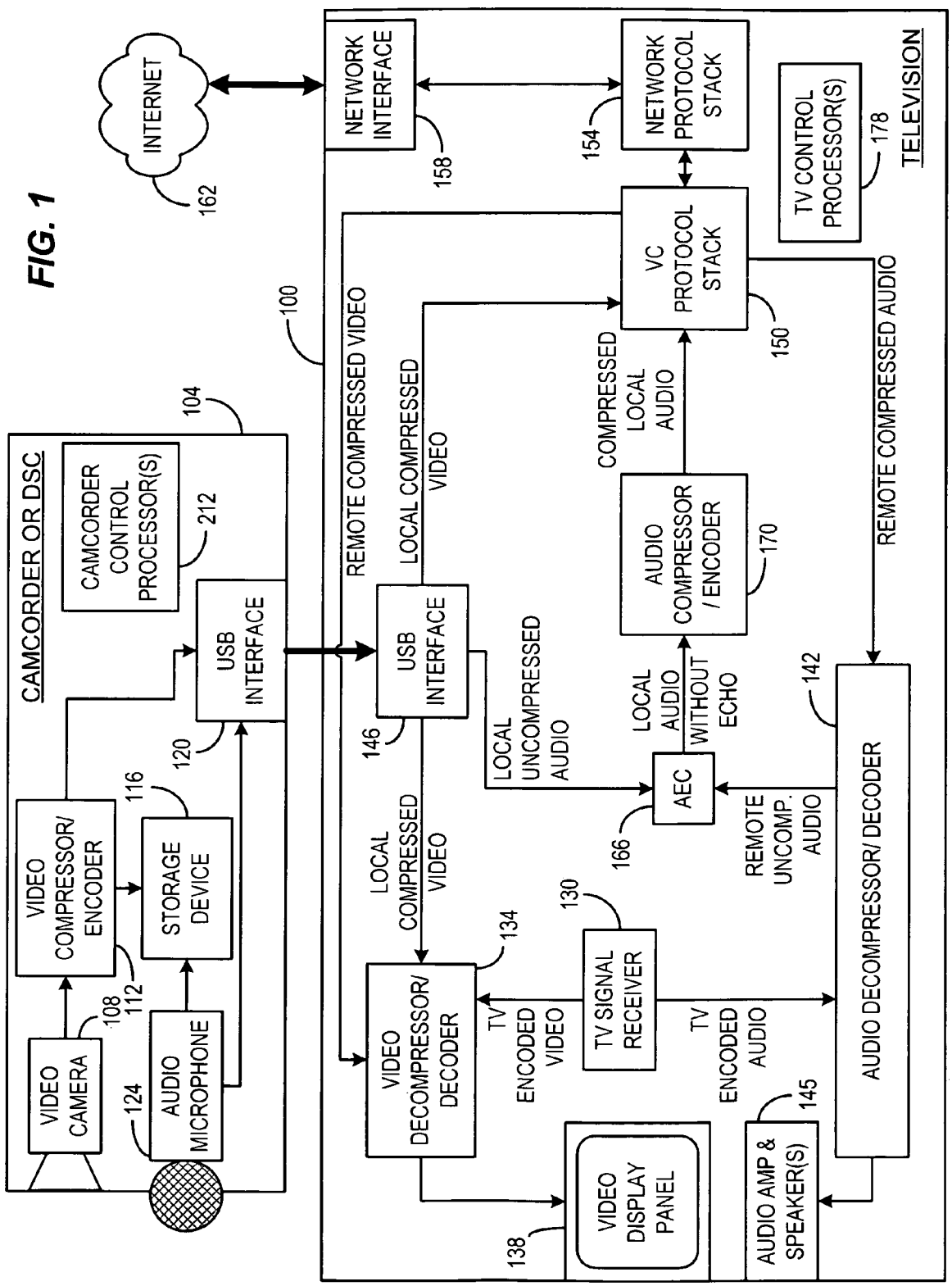
FIG. 1 is a block diagram of a first example implementation of a videoconferencing arrangement consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "local" as used herein means audio and video generated as a result of pickup by a camera and microphone of a camcorder for processing with a closely situated television forming one end of a videoconferencing system. The term "remote" as used herein means a non-locally situated end of the videoconferencing system in communication with the local videoconferencing system.

By making changes in the functionality of a digital TV and a digital still camera (DSC) or a camcorder, a videoconferencing system can be implemented for minimal incremental hardware cost. In accord with certain implementations consistent with the present invention, but with the addition of videoconferencing control, acoustic echo cancellation, and appropriate codecs to these devices, videoconferencing can be carried out without need for specialized videoconferencing hardware and without need for a personal computer.

The primary components of a videoconferencing system are the display, camera, microphone, and processing module. It is noted that many of the components found in a videoconferencing system can also be found in a video camera or digital still camera and a television set (a TV). By using these components with circuitry to do acoustic echo cancellation, compression and decompression of audio and video signals, and the protocol stack for networking and videoconferencing, the incremental cost is minimal for the user to also obtain videoconferencing capability.

TVs and camcorders/DSCs are changing and containing new features that bring them closer and closer to containing between them the required features for a complete videoconferencing system without adding much if any new hardware, other than a (USB) cable (or other suitable cable) to connect them together. Significant changes to the TV and/or DSC or camcorder primarily involve inclusion of video conference (VC) call connection functionality (via software) and probably an acoustic echo canceller (AEC). AEC can be done in either the camera or TV, but the camera may be more likely to have a higher end programmable DSP that could do the processing. Alternatively this functionality can be placed in the TV, at the possible cost of an upgrade in the TV to more powerful signal processing hardware than might otherwise be present. The call connection functionality can be added to either the camera or the TV, but TVs commonly contain networking hardware, so the hardware cost could be minimal. The VC call connection functionality includes at minimum networking hardware and protocols to support data communicating with the remote side, as well as VC protocol stacks to initiate, accept and close down calls, negotiate call capabilities and other call control features that are well known in the art, and some user interface to manipulate the calls, and may also include telephone directory and other optional functionality.

Note that in implementation of the above changes, there are basically only small feature changes to the various hardware components. The larger changes are to add the VC call connection capability (via software), and providing the AEC. Of course, accomplishing these changes may call for increased computing power over that ordinarily provided in a TV or camera. This means that a complete VC system can be built with only two components: an appropriately designed camcorder and an appropriately designed TV having Internet access with, preferably, AEC implemented within the TV or camera.

As used herein, "echo cancelled audio" and similar terms is audio from a local microphone that has suppressed from it, to at least some degree, and preferably to the greatest degree possible, any audio that has been generated by the VC or TV system. This can be done through a variety of means, such as adaptive filters, half-duplex audio, near field microphones, beam forming, etc.

Turning to FIG. 1, one example implementation is depicted in which the AEC functionality is implemented in the TV 100. In this example implementation, a camcorder or DSC 104 (camcorder and DSC are used interchangeably herein). The camcorder includes normal camcorder elements including a video camera 108 that captures video images in a conventional manner and then compresses and encodes the images captured at video compressor/encoder 112. For video conferencing, the preferred compression technique is presently ITU-T H.264 compression but can be implemented as any suitable VC video protocol, hence the camcorder 104 should incorporate a hardware or programmed processor based codec that is compatible therewith. Video compressor/encoder 112 provides video signals both to a storage device (e.g., a hard disc drive or other recording medium) 116 as well as a universal serial bus (USB) interface 120.

Audio is captured at a microphone 124 and associated circuitry (for simplicity shown collectively as 124) for storage in digital form at storage device 116. The digitized audio is also encoded provided to USB interface 120. The user interface functions for the camcorder as well as any suitable portion of the video conferencing functions can be provided using the camcorder's internal control processor(s) 212. In this configuration, the video and audio for a video conference can be captured and transferred via a USB (or miniature or micro USB) port to the television. The camcorder can then be mounted to a tripod, or placed in a convenient location above or adjacent the television when a video conference is to be carried out.

The TV 100 incorporates the remainder of the circuitry used to implement video conferencing. The TV 100, of course, includes a TV signal receiver 130 that supplies television encoded video to a video decompressor/decoder 134 that supplies the decompressed and decoded video to a video display panel 138. The TV signal receiver also produces encoded TV audio hat is supplied to audio decompressor/decoder 142 and fed to internal or external audio amplifiers and loudspeakers represented here as 146.

In addition, when operating in the video conference mode, video decompressor/decoder 134 receives local compressed video from a USB interface 146 within the TV and provided via USB interface 120 of video camera 104 for display on the television's video display panel 138. Further, when operating in the video conference mode, video decompressor/decoder 134 receives remote compressed video from a VC protocol stack 150 within the TV 100 for display on the television's video display panel 138. VC protocol stack 150 receives remote compressed video conference video from a network protocol stack 154 via a network interface 158 over the Internet 162. VC protocol stack 150 additionally receives remote compressed video conference audio from network protocol stack 154 via network interface 158 over the Internet 162. The remote compressed audio from VC protocol stack 150 is passed to the audio decompressor/decoder 142 for reproduction on audio circuits and loudspeakers 146.

The remote decompressed audio from 142 and the local uncompressed audio from 146 are provided to the audio echo canceller 166 to provide local audio without echo to an audio compressor/encoder 170. Compressor/encoder 170 carries out compression and encoding functions, preferably using G.7xx encoding, but could be any suitable VC audio protocol, and supplies echo cancelled compressed local audio to the VC protocol stack 150 bound for the network protocol stack 154 and subsequently to the remote VC recipient(s) via the network protocol stack 154, the network interface 158 and the Internet 162. The user interface functions and operation of any programmed processor based implementations of the functional blocks described can be carried out by one or more TV control processors 178.

Hence, in the above implementation, minimal changes are implemented in a camcorder or DSC to implement videoconferencing. Audio and compressed video are passed via a USB (or other suitable interface) cable from the camcorder to the TV where AEC functions are carried out and the main videoconference control is carried out. This implementation has the benefit of minimal modification of a camcorder or DSC 104 so as to minimize cost, complexity and battery consumption thereof (if used without auxiliary power), while optimizing use of a potentially larger housing and power supply capabilities of the television set 100.

However, this particular arrangement is not the only possible configuration, since the VC specific components and functionality can also be more heavily distributed within the camcorder as depicted in FIG. 2 rather than television 200. This distribution takes advantage of the relatively higher computing power that is generally present in a modern camcorder, at the potential expense of size and power consumption in the camcorder 204.

In this implementation, the AEC functionality is implemented in the camcorder 204. In this example implementation, a camcorder or DSC 204 includes the normal camcorder elements including a video camera 108 that captures video images in a conventional manner and then compresses and encodes the images captured at video compressor/encoder 112. For video conferencing, the preferred compression technique is presently ITU-T H.264 compression, hence the camcorder 104 should incorporate a hardware or programmed processor based codec that is compatible therewith. Video compressor/encoder 112 provides video signals both to a storage device (e.g., a hard disc drive or other recording medium) 116 as well as a universal serial bus (USB) interface 208.

Audio is captured at a microphone 124 and associated circuitry (for simplicity shown collectively as 124) for storage in digital form at storage device 116. The digitally encoded audio (preferably encoded using G.7xx encoding) is also encoded provided to USB interface 208. The user interface functions for the camcorder as well as any suitable portion of the video conferencing functions can be provided using the camcorder's internal control processor(s) 212.

The audio from microphone and audio circuits 124 are also supplied to a camcorder based AEC 218 which also receives remote side decompressed audio from the USB interface 208 and produces as an output local audio without echo to audio compressor/encoder 222. The audio compressor/encoder 222 produces compressed local audio which is sent to TV 200 via the USB interface 208. It is noted that the AEC can be located on the USB interface side of the audio compressor 222 and can receive compressed audio from USB interface 208 in order to decompress and echo cancel and recompress in an alternative embodiment. However, the configuration shown minimizes the number of audio compression/decompression operations involved.

The compressed and both encoded local audio and compressed and encoded local video are thus passed via the USB port 208 to the television 200 for further processing. The USB port 208 is coupled to the TV in both embodiments using a USB cable or other suitable interconnection so that the compressed and encoded local audio and compressed and encoded local video are received at USB port 228 of the TV 200, and thus, the video and audio for a video conference can be captured and transferred via a USB (or miniature or micro USB) port to the television. The camcorder can then be mounted to a tripod, or placed in a convenient location above or adjacent the television when a video conference is to be carried out.

The TV 200 again incorporates the remainder of the circuitry used to implement video conferencing. The TV 200 again includes a TV signal receiver 130 that supplies television encoded video to video decompressor/decoder 134 that supplies the decompressed and decoded video to video display panel 138. The TV signal receiver also produces encoded TV audio hat is supplied to audio decompressor/decoder 142 and fed to internal or external audio amplifiers and loudspeakers again represented here as 145.

When operating in the video conference mode, video decompressor/decoder 134 receives local compressed video from a USB interface 228 within the TV and provided via USB interface 208 of video camera 204 for display on the television's video display panel 138. Further, when operating in the video conference mode, video decompressor/decoder 134 receives remote compressed video from VC protocol stack 150 within the TV 200 for display on the television's video display panel 138. VC protocol stack 150 receives remote compressed video conference video from a network protocol stack 154 via a network interface 158 over the Internet 162. VC protocol stack 150 additionally receives remote compressed video conference audio from network protocol stack 154 via network interface 158 over the Internet 162. The remote compressed audio from VC protocol stack 150 is passed to the audio decompressor/decoder 142 for reproduction on audio circuits and loudspeakers 145.

The remote decompressed audio from 142 and the local uncompressed audio from 146 are provided to the audio echo canceller 218 within the camcorder 204 in this implementation to provide local audio without echo to audio compressor/encoder 222 (also in the camcorder) which supplies echo cancelled compressed local audio to the VC protocol stack 150 bound for the network protocol stack 154 and subsequently to the remote VC recipient(s) via the network protocol stack 154, the network interface 158 and the Internet 162. In this case, however, the echo cancelled audio is passed in compressed form via the USB interfaces 208 and 228 rather than being echo cancelled in the TV 200 as in the prior example. The user interface functions and operation of any programmed processor based implementations of the functional blocks described can be carried out by one or more TV control processors 278.

In preferred implementations, DSC/camcorder video latency should be minimized. Audio codecs in both the TV and the camcorder should be VC appropriate codecs. In certain implementations, all audio encoding/decoding could be done in either the camcorder or all in the TV. If AEC is done in the TV then audio encoding is preferably also done in the TV; hence, hardware/software in conjunction with a suitable processor should be provided in the TV. The H.264 video encoder in the DSC or camcorder should preferably be responsive to the data rate that the network channel can support in terms of resolution, frame rate, bit rate, etc. The H.264 video compressor/encoder in the DSC or camcorder should preferably support IPPPPPPPP . . . format and the baseline profile (these are most appropriate modes for VC). Also, preferably the video compressor/encoder will adapt its output bit rate to the dynamically changing bit rate of the Internet connection between the local and remote side, according to control from the VC protocol stack. In certain embodiments, this bit rate adaptation is controlled via control messages between the camera and the TV via the digital interface. Also, ideally the video decoder in the TV would handle multiple H.264 decodes so the user could see his own local video and the remote side video at the same time. Alternatively it would switch back and forth as requested. It is desirable that the preferred method the AEC would be situated in the location (camcorder or TV) where it is least expensive. Other variations will occur to those skilled in the art upon consideration of the present teachings.

Thus, a television having videoconferencing capabilities consistent with certain embodiments has a television receiver that receives television signals and generates audio and video signals that drive audio circuitry and a video display respectively; a video decompressor/decoder residing in the television that receives compressed and encoded video and decompresses and decodes the compressed video for display on the video display. An audio decompressor/decoder resides in the television and receives compressed and encoded audio and decompresses and decodes the audio to drive the audio circuitry. A digital interface residing in the television receives locally generated digital audio and video signals from a local camcorder or digital still camera. A videoconference protocol stack residing in the television receives the locally generated audio and video signals from the local camcorder. A network interface residing in the television couples the locally generated audio and the local video signals to the Internet, and receives remotely generated compressed audio and video signals and passes the remotely generated compressed audio and video signals to the videoconference protocol stack. The remotely generated compressed audio and video signals are coupled from the videoconference stack to the audio and video decompressor/decoders respectively.

In certain implementations, acoustic echo cancellation is performed to improve the quality of local audio being sent to the remote side. In certain implementations the acoustic echo cancellation is carried out by an acoustic echo canceller residing in the television. In certain implementations, the acoustic echo canceller receives local uncompressed audio from the digital interface and remote decompressed audio from the audio decompressor/decoder and carries out the echo cancellation function based upon the uncompressed local and remote decompressed audio to produce the acoustically echo cancelled local audio. In certain implementations, the acoustically echo cancelled local audio is processed by an audio compressor/encoder in the television prior to receipt by the videoconference protocol stack. In certain implementations, the videoconference protocol stack communicates with the network interface via a network protocol stack in the television. In certain implementations, the digital interface comprises a universal serial bus interface. In certain implementations, the acoustic echo cancellation is carried out in an acoustic echo canceller residing in the camcorder or digital still camera. In certain implementations, the acoustic echo canceller receives local uncompressed audio from a camcorder or digital still camera microphone, and carries out the echo cancellation function based upon the uncompressed local and remote decompressed audio coupled from the television's digital interface to produce the acoustically echo cancelled local audio. In certain implementations, the acoustically echo cancelled local audio is processed by an audio compressor/encoder in the camcorder prior to receipt by digital interface and prior to coupling to the videoconference protocol stack. In certain implementations, the videoconference protocol stack communicates with the network interface via a network protocol stack in the television. In certain implementations, the video decompressor/decoder in the TV includes a plurality of decompressor/decoders in order to carry out multiple decodes so as to display both the local and the remote video on the video display simultaneously. In certain implementations, the remotely generated compressed audio and video signals are bit rate adapted dynamically to the changing bit rate of the Internet connection according to control from the video conference protocol stack.

In certain embodiments, a television having videoconferencing capabilities has a television receiver that receives television signals and generates audio and video signals that drive audio circuitry and a video display respectively. A video decompressor/decoder residing in the television receives compressed and encoded video and decompresses and decodes the compressed video for display on the video display. An audio decompressor/decoder residing in the television receives compressed and encoded audio and decompresses and decodes the audio to drive the audio circuitry. A universal serial bus digital interface residing in the television receives locally generated digital audio and video signals from a local camcorder or digital still camera. An audio echo canceller resides in the television wherein, the acoustic echo canceller receives local uncompressed audio from the digital interface and remote decompressed audio from the audio decompressor/decoder and carries out the echo cancellation function based upon the uncompressed local and remote decompressed audio to produce the acoustically echo cancelled local audio. A videoconference protocol stack resides in the television that receives the locally generated audio and video signals from the local camcorder, wherein the locally generated audio comprises acoustic echo cancelled audio. A network interface resides in the television and couples the locally generated acoustic echo cancelled audio and the local video signals to the Internet, and receives remotely generated compressed audio and video signals and passes the remotely generated compressed audio and video signals to the videoconference protocol stack. The remotely generated compressed audio and video signals are coupled from the videoconference stack to the audio and video decompressor/decoders respectively.

In certain implementations, the acoustically echo cancelled local audio is processed by an audio compressor/encoder in the television prior to receipt by the videoconference protocol stack. In certain implementations, the videoconference protocol stack communicates with the network interface via a network protocol stack in the television. In certain implementations, the remotely generated compressed audio and video signals are bit rate adapted to a bit rate of the Internet connection according to control from the video conference protocol stack.

A television having videoconferencing capabilities consistent with certain embodiments has a television receiver that receives television signals and generates audio and video signals that drive audio circuitry and a video display respectively. A video decompressor/decoder residing in the television receives compressed and encoded video and decompresses and decodes the compressed video for display on the video display. An audio decompressor/decoder residing in the television receives compressed and encoded audio and decompresses and decodes the audio to drive the audio circuitry. A universal serial bus digital interface residing in the television receives locally generated digital audio and video signals from a local camcorder or digital still camera. A videoconference protocol stack residing in the television receives the locally generated audio and video signals from the local camcorder, wherein the locally generated audio comprises acoustic echo cancelled audio. The acoustically echo cancelled local audio is processed by an audio compressor/encoder in the television prior to receipt by the videoconference protocol stack. A network interface residing in the television couples the locally generated audio and the local video signals to the Internet, and receives remotely generated compressed audio and video signals and passes the remotely generated compressed audio and video signals to the videoconference protocol stack. The remotely generated compressed audio and video signals are coupled from the videoconference stack to the audio and video decompressor/decoders respectively.

In certain implementations, the videoconference protocol stack communicates with the network interface via a network protocol stack in the television. In certain implementations, the videoconference protocol stack communicates with the network interface via a network protocol stack in the television. In certain implementations, the acoustic echo canceller receives local uncompressed audio from a camcorder or digital still camera microphone, and carries out the echo cancellation function based upon the uncompressed local and remote decompressed audio coupled from the television's digital interface to produce the acoustically echo cancelled local audio. In certain implementations, the local audio is processed by an audio compressor/encoder prior in the camcorder prior to receipt by digital interface and prior to coupling to the videoconference protocol stack. In certain embodiments the local audio is processed by an acoustic echo canceller prior to receipt by the digital interface and prior to coupling to the videoconference protocol stack. In certain implementations, the video decompressor/decoder in the TV includes a plurality of decompressor/decoders in order to carry out multiple decodes so as to display both the local and the remote video on the video display simultaneously. In certain implementations, the remotely generated compressed audio and video signals are dynamically bit rate adapted to a changing bit rate of the Internet connection according to control from the video conference protocol stack.

A camera having videoconferencing capabilities consistent with certain embodiments has a video camera that receives images and converts the images to video signals and a microphone that receives sounds and generates audio signals there from. A video compressor/encoder residing in the camera receives the video signal and compresses and decodes the video signals into compressed video signals. An audio compressor/encoder residing in the camera receives the audio signals and generates compressed and encoded audio signals. A digital interface residing in the camera receives the compressed digital audio and video signals for transport outside the camera. In certain implementations an acoustic echo canceller residing in the camera carries out an acoustic echo cancellation on the audio signal prior to the audio signal being provided to the digital interface.

In certain implementations, the acoustic echo canceller receives uncompressed audio from the microphone and remote decompressed audio from the digital interface and carries out the echo cancellation function based upon the uncompressed audio signal and the remote decompressed audio to produce acoustically echo cancelled audio signals. In certain implementations, a videoconference protocol stack situated in an interconnected television communicates with the network interface via a network protocol stack in the television. In certain implementations, the digital interface comprises a universal serial bus interface.

Another camera having videoconferencing capabilities consistent with certain implementations has a video camera that receives images and converts the images to video signals and a microphone that receives sounds and generates audio signals therefrom. A video compressor/encoder residing in the camera receives the video signal and compresses and decodes the video signals into compressed video signals. An audio compressor/encoder residing in the camera receives the audio signals and generates compressed and encoded audio signals. A digital interface residing in the camera receives the compressed digital audio and video signals for transport outside the camera. Audio or video signals are passed to the digital interface at a bit rate that is dynamically adapted in response to an external request received over the digital interface.

In certain implementations, an acoustic echo canceller resides in the camera and carries out an acoustic echo cancellation on the audio signal prior to the audio signal being provided to the digital interface. In certain implementations, the acoustic echo canceller receives uncompressed audio from the microphone and remote decompressed audio from the digital interface and carries out the echo cancellation function based upon the uncompressed audio signal and the remote decompressed audio to produce acoustically echo cancelled audio signals. In certain implementations, a videoconference protocol stack situated in an interconnected television communicates with the network interface via a network protocol stack in the television. In certain implementations, the digital interface comprises a universal serial bus interface.

Those skilled in the art will recognize, upon consideration of the above teachings, that certain of the above exemplary embodiments can be implemented using one or more programmed processors. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

While certain illustrative embodiments have been described, it is evident that many alternatives, modifications, permutations and variations will become apparent to those skilled in the art in light of the foregoing description.

What is claimed is:

1. A camera having videoconferencing capabilities, the camera comprising:
   a video camera that receives images and converts the images to video signals and a microphone that receives sounds and generates audio signals therefrom;
   a video compressor/encoder residing in the camera that receives the video signal and compresses and decodes the video signals into compressed video signals;
   an audio compressor/encoder residing in the camera that receives the audio signals and generates compressed and encoded audio signals;
   a camcorder control processor;
   a storage device residing within the video camera that receives the compressed and encoded video signals and the compressed and encoded audio signals and stores the compressed and encoded video and audio signals in the storage device so that the video camera carries out the functions of a camcorder under control of the camcorder control processor;
   a digital interface residing in the camera that also receives the compressed and encoded digital audio and video signals for transport outside the camera;
   where audio or video signals are passed to the digital interface at a bit rate that is dynamically adapted in response to an external request received over the digital interface; and
   an acoustic echo canceller residing in the camera that carries out an acoustic echo cancellation on the audio signal prior to the audio signal being provided to the digital interface.

2. The camera having videoconferencing capabilities according to claim 1, wherein the acoustic echo canceller receives uncompressed audio from the microphone and remote decompressed audio from the digital interface and carries out the echo cancellation function based upon the uncompressed audio signal and the remote decompressed audio to produce acoustically echo cancelled audio signals.

3. The camera having videoconferencing capabilities according to claim 1, wherein a videoconference protocol stack situated in an interconnected television communicates with the network interface via a network protocol stack in the television.

4. The camera having videoconferencing capabilities according to claim 1, wherein the digital interface comprises a universal serial bus interface.

5. A camera having videoconferencing capabilities, the camera comprising:
   a video camera that receives images and converts the images to video signals and a microphone that receives sounds and generates audio signals therefrom;
   a video compressor/encoder residing in the camera that receives the video signal and compresses and decodes the video signals into compressed video signals;
   an audio compressor/encoder residing in the camera that receives the audio signals and generates compressed and encoded audio signals;
   a camcorder control processor;
   a storage device residing within the video camera that receives the compressed and encoded video signals and the compressed and encoded audio signals and stores the compressed and encoded video and audio signals in the storage device so that the video camera carries out the functions of a camcorder under control of the camcorder control processor;
   a digital interface residing in the camera that also receives the compressed and encoded digital audio and video signals for transport outside the camera; and where audio or video signals are passed to the digital interface at a bit rate that is dynamically adapted in response to an external request received over the digital interface.

6. The camera having videoconferencing capabilities according to claim 5, further comprising an acoustic echo canceller residing in the camera that carries out an acoustic echo cancellation on the audio signal prior to the audio signal being provided to the digital interface.

7. The camera having videoconferencing capabilities according to claim 6, wherein the acoustic echo canceller receives uncompressed audio from the microphone and remote decompressed audio from the digital interface and carries out the echo cancellation function based upon the uncompressed audio signal and the remote decompressed audio to produce acoustically echo cancelled audio signals.

8. The camera having videoconferencing capabilities according to claim 5, wherein a videoconference protocol stack situated in an interconnected television communicates with the network interface via a network protocol stack in the television.

9. The camera having videoconferencing capabilities according to claim 5, wherein the digital interface comprises a universal serial bus interface.

* * * * *